United States Patent Office
3,190,752
Patented June 22, 1965

3,190,752
HIGH EDGE GRADIENT SILVER HALIDE EMULSION
Yoshihide Hayakawa, Kosaiji, Minamiashigara-machi, Ashigarakami-gun, Kanagawa-ken, and Yosuke Nakajima, Minamiashigara-machi, Ashigarakami-gun, Kanagawa-ken, Japan, assignors to Fuji Photo Film Co., Ltd., Minamiashigara-machi, Ashigarakami-gun, Kanagawa-ken, Japan, a corporation of Japan
No Drawing. Filed Nov. 27, 1962, Ser. No. 240,452
Claims priority, application Japan, Dec. 26, 1961, 36/47,418
1 Claim. (Cl. 96—107)

This invention relates to a photographic emulsion of silver halide and more particularly to a photographic emulsion giving the image of high edge-gradient.

The ratio of change in density to distance at the boundary between the darkened part and the undarkened part of the photographic image is called "edge gradient." In general, the higher the edge gradient, the sharper the image. In order to obtain the image of high edge-gradient, a special developing solution which contains a small amount of sulfite salt, has a high pH value and contains hydroquinone alone as developer, has been employed (for example, ref. Yule, J.A.C., "Formaldehyde-Hydroquinone Developers and Infectious-Development," J. Frank. Inst. 239, 221 (1945)).

It is the object of this invention to provide a photographic emulsion which gives the image of high contrast when a developing solution of this type is employed.

Photosensitive materials using such emulsion are suitable for making the half-tone reproductions by means of reproduction screens such as glass screen and contact screen. The above-mentioned object can be attained by adding to the emulsion (1) the derivative of 4-hydroxy-1,3,3a,7-tetrazaindene and (2) at least one compound selected from the group consisting of lysine, ornithine, arginine and their salts, and N-[(dialkylamino)alkyl]carbamates and their salts. The derivatives of 4-hydroxy-1,3,3a,7-tetrazaindene are represented by the following structural formula:

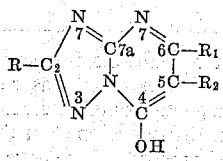

where $R$ and $R_1$ represent hydrogen atom, alkyl group, aralkyl group or aryl group, and $R_2$ represents hydrogen atom, alkyl group, carboxy group or carboalkoxy group. N-[(dialkylamino)alkyl]carbamates are represented by the following structural formula:

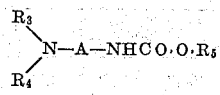

where $R_3$, $R_4$ and $R_5$ represent alkyl group, and A represents alkylene group. Moreover, the total number of carbon atom contained in $R_3$, $R_4$, $R_5$ and A groups is not less than 9, and $R_3$ and $R_4$ may combine to form a ring.

The derivatives of tetrazaindene capable of being employed in this invention can be synthetized by heating 1 mole of β-ketoesters, malonic esters or α-ethoxymethylene-β-ketoesters with 1 mole of 3-amino-1,2,4,triazoles. Examples of such tetrazaindene are as follows:

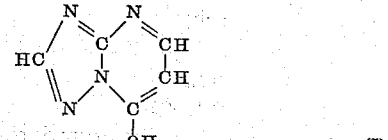

(I)

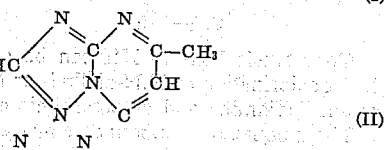

(II)

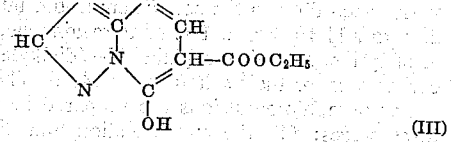

(III)

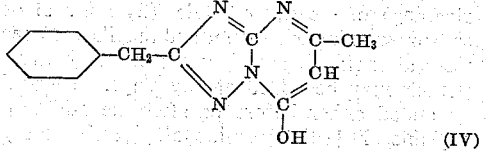

(IV)

Additional examples of tetrazaindens are as follows:

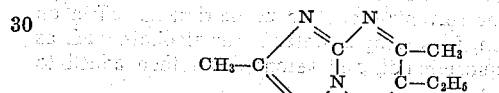

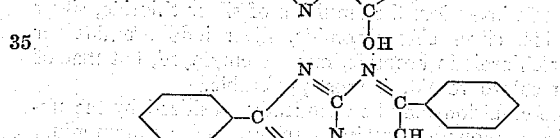

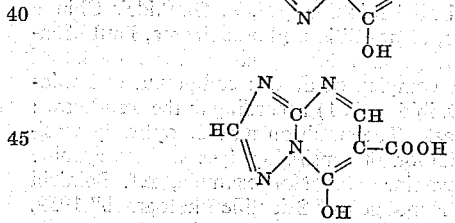

Lysine, ornithine, and arginine used in this invention are basic amino-acid, and both that prepared by the decomposition of proteins and that prepared by synthesis may be employed. These compounds are represented by the following structural formulae:

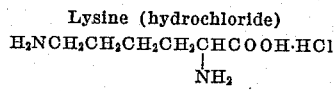

(V)

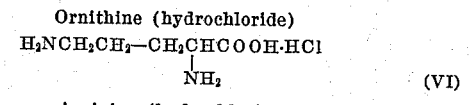

(VI)

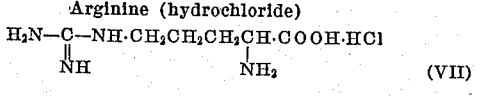

(VII)

Examples of N-[(dialkylamino)alkyl]carbamates employed in this invention are as follows:

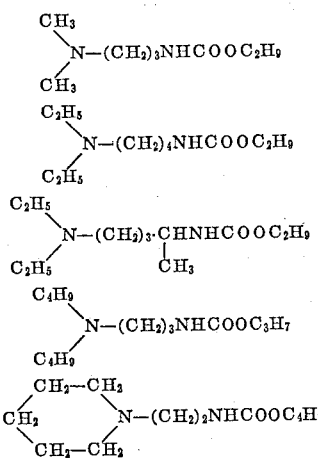

Compounds VIII to XII can be obtained by the dehydrochlorination of N,N-dialkyl- or N,N-polymethyleneaminoalkylamine and chlorcarbonic ester.

The amount of compounds employed in this invention varies according to the sort of emulsion, but it is preferable to add 10 mg. to 1 g. of tetrazaindene, 0.1 g. to 10 g. of lysine, ornithine, arginine N-[(dialkylamino)alkyl]-carbamates, or their salts per 1 mole of silver halide.

Photographic emulsions are prepared in the following three stages: (1) the emulsification and digestion (first ripening) of the silver halide, (2) removal of excess of salts by washing with water and the like, (3) second digestion (after ripening) to increase the sensitivity. The compounds may be added at any stage. Tetrazainden may be added either before or after the addition of lysine, arginine, N-[(dialkylamino)alkyl]carbamates, but it is most preferable to add these substances after the second ripening and before coating. These substances are dissolved in the solvents that have no detrimental effect on the emulsion, for example, water lower alcohols, such as methanol and ethanol, and ketones, and then added to the emulsion.

In this invention, the emulsion of silver chloride, silver bromide, silver chlorobromide, silver iodo bromide, or silver chloroiodo bromide, may be employed, but that of silver chlorobromide is most preferable.

The emulsion may be chemically sensitized by the unstable compounds containing sulfur, such as ammonium thiosulfate, and allyl thiourea (ref. P. Glafkide's Chimie Photograpeque, 2ème edition, Photochinema, Paul Montel, Paris, 1957, pp. 297–299), and/or a compound of gold such as a complex of aurous compound and thiocyanic acid (ref. ibid, p. 301) according to the well-known method in the art. The emulsion may be optically sensitized by the addition of sensitizing dyes such as cyanine dyes or merocyanine dyes (for example, ref. Shinichi Kikuchi et al. "Handbook of Scientific Photograph" 1959, pp. 15–24, Maruzen Co.). The emulsion may contain a hardening agent such as chromium alum, formaldehyde, or others (ref. ibid. pp. 29–47). In order to facilitate the coating of emulsion, a surface-active agent may be added.

Tetrazaindenes have been well known as a stabilizer in the emulsion for negatives, but are employed in this invention to improve the contrast. When tetrazaindenes are used alone, the improvement of the halftone-dot due to the improvement of contrast, that is, the increase of edge-gradient, cannot be attained because of the decrease of developing rate. Satisfactory results can be obtained by using tetrazaindenes along with arginine, ornithine, lysine or above-mentioned N-(dialkylamino)alkyl carbamates.

In order to facilitate the understanding of this invention, examples will be given hereafter. It should be realized that this invention is not limited by examples but limited by the appended claim.

Example 1

Four samples were prepared by adding 6-methyl-4-hydroxy-1,3,3a,7-tetrazaindene (II) and/or hydrochloride of lysine (V) to the emulsion of silver chlorobromide which contains 30 mole percent of silver bromide, the optimum amounts of sensitizing dye and hardening agent, and gelatin in a proportion of 105 g. of gelatin to 1 mole of silver halide. The amount of (II) and (V) were as follows:

| Sample | (G./1 mole of silver halide) | |
|---|---|---|
| | (II) | (V) |
| (i) | 0 | [1] 0 |
| (ii) | 0.96 | 0 |
| (iii) | 0 | 4.09 |
| (iv) | 0.96 | 4.09 |

[1] Reference.

These samples were coated on film bases and dried. Then sensitometry and evalution of halftone-dot were carried out using these test films.

Sensitometry was carried out in the following manner. A test film was exposed to light, emitted from a tungsten lamp (2666° K.) and passing through an optical stepwedge, and then developed at 20° C. in a developer of the following formula:

| | | |
|---|---|---|
| Water (about 30° C.) | cc | 500 |
| Sodium sulfite (anhydrate) | g | 300 |
| Para-formaldehyde | g | 7.5 |
| Sodium bisulfite | g | 2.2 |
| Boric acid | g | 7.5 |
| Hydroquinone | g | 22.5 |
| Potassium bromide | g | 1.6 |
| Additional water | | Balance |
| Total | liter | 1 |

The evaluation of halftone-dot was carried out in the following manner. A test film was closely contacted on a commercial magenta contact screen (150 lines) during exposure and then developed in the same way as in the case of sensitometry. The developed halftone-dot was observed by means of a microscope and classified into five classes A, B, C, D and E in accordance with the sharpness of edge of dot. The results of development of 1′ 30″, 2′ 15″ and 3′ at 20° C. are listed in the following table.

| Sample | Relative sensitivity | | | Contrast [1] | | | Sharpness of dot | | |
|---|---|---|---|---|---|---|---|---|---|
| | 1′30″ | 2′15″ | 3′ | 1′30″ | 2′15″ | 3′ | 1′30″ | 2′15″ | 3′ |
| (i) | 25 | 63 | 100 | 4.0 | 7.3 | 7.0 | D | B | C |
| (ii) | 12 | 23 | 65 | 2.7 | 5.5 | 7.5 | E | C | A |
| (iii) | 58 | 79 | 103 | 7.7 | 6.9 | 6.2 | A | C | D |
| (iv) | 35 | 70 | 97 | 6.1 | 8.1 | 7.2 | B | A | B |

[1] Average slope between base density + fog density + 0.1 and base density + fog density + 2.1.

As seen from this table, sample (iv) provides sharp dots of high contrast in a wide range of time of development.

Example 2

As in Example 1, four samples were prepared by adding 5-carboxy-4-hydroxy-1,3,3a,7-tetrazaindene (II) and/or hydrochloric salt of arginine (VII) to the emulsion. The amounts of (II) and (VII) per 1 mole of silver halide were as follows:

| Sample | (G./1 mole of silver halide) | |
|---|---|---|
| | (II) | (VII) |
| (i) | 0 | [1] 0 |
| (ii) | 0.24 | 0 |
| (iii) | 0 | 1.9 |
| (iv) | 0.24 | 1.9 |

[1] Reference.

Results of test are summarized in the following table:

| Sample | Relative sensitivity | | | Contrast [1] | | | Sharpness of dot | | |
|---|---|---|---|---|---|---|---|---|---|
| | 1'30" | 2'15" | 3' | 1'30" | 2'15" | 3' | 1'30" | 2'15" | 3' |
| (i) | 25 | 63 | 100 | 4.0 | 7.3 | 7.0 | D | B | C |
| (ii) | 11 | 20 | 55 | 2.3 | 4.9 | 7.5 | C | C | A |
| (iii) | 77 | 90 | 103 | 7.3 | 5.7 | 5.4 | A | C | D |
| (iv) | 25 | 57 | 85 | 4.2 | 7.7 | 8.1 | B | A | A |

[1] Average slope between base density + fog density + 0.1 and base density + fog density + 2.1.

As seen from this table, (iv) provides sharp dots of high contrast in a wide range of time of development.

Example 3

As in Example 1, four samples were prepared by adding 4-hydroxy-1,3,3a,7-tetrazaindene (I) and/or N-[(dialkylamino)alkyl]carbamates (X) to the emulsion. The amounts of (I) and (X) per 1 mole of silver halide are as follows:

| Sample | (G./1 mole of silver halide) | |
|---|---|---|
| | Amount of (I) | Amount of (X) |
| (i) | 0 | [1] 0 |
| (ii) | 0.77 | 0 |
| (iii) | 0 | 3.3 |
| (iv) | 0.77 | 3.3 |

[1] Reference.

Results of test are summarized in the following table:

| Sample | Relative sensitivity | | | Contrast | | | Sharpness of dot | | |
|---|---|---|---|---|---|---|---|---|---|
| | 1'30" | 2'15" | 3' | 1'30" | 2'15" | 3' | 1'30" | 2'15" | 3' |
| (i) | 25 | 63 | 100 | 4.0 | 7.3 | 7.0 | D | B | C |
| (ii) | 13 | 27 | 70 | 3.1 | 6.5 | 7.4 | E | E | A |
| (iii) | 53 | 75 | 105 | 7.2 | 6.9 | 6.1 | A | C | D |
| (iv) | 38 | 72 | 97 | 6.3 | 7.9 | 7.2 | B | A | B |

As seen from this table, sample (iv) provided sharp dots of high contrast in a wide range of time of development.

What is claimed is:

A photographic emulsion of silver halide characterized in that in order to increase the edge gradient of image the said emulsion contains (1) at least one compound selected from the group consisting of 4-hydroxy-1,3,3a,7-tetrazaindenes which are represented by the following structural formula:

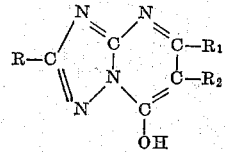

in which R and $R_1$ represent a member selected from the group consisting of hydrogen atom and alkyl groups and $R_2$ represents a member selected from the group consisting of hydrogen atom, alkyl groups, carboxy groups, carboalkoxy groups, and (2) at least one compound selected from the group consisting of N-[(dialkylamino)alkyl] carbamates which are represented by the following structural formula:

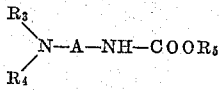

in which $R_3$, $R_4$ and $R_5$ each represents an alkyl group containing not more than 4 carbon atoms, $R_3$ and $R_4$ may combine to form a ring, A represents an alkylene group containing not more than 5 carbon atoms, and the total number of carbon atoms contained in $R_3$, $R_4$, $R_5$ and A is not less than 9, and the mineral acid salts of said carbamates.

References Cited by the Examiner

UNITED STATES PATENTS 2,944,902  7/60  Carroll et al. _____ 96—107

FOREIGN PATENTS 259,926  9/27  Great Britain.
619,077  7/28  France.
100,681  1/41  Sweden.

NORMAN G. TORCHIN, *Primary Examiner*.